United States Patent [19]
Ryan

[11] Patent Number: 6,085,820
[45] Date of Patent: Jul. 11, 2000

[54] HEAT SEAL BUTT SPLICE ASSEMBLY

[75] Inventor: Ralph L. Ryan, East Hanover, N.J.

[73] Assignee: CTC International Inc., West Caldwell, N.J.

[21] Appl. No.: 09/110,002

[22] Filed: Jul. 2, 1998

[51] Int. Cl.⁷ .............................. B31F 5/00; B65H 19/00; B65H 19/18; B65H 21/00
[52] U.S. Cl. ...................... 156/504; 156/157; 156/502; 156/507; 156/515; 242/555; 242/555.3; 242/556
[58] Field of Search ...................................... 156/157, 159, 156/304.1, 304.6, 324, 251, 502, 504, 507, 515; 242/555, 555.3, 556, 555.1

[56] References Cited

U.S. PATENT DOCUMENTS

| | | |
|---|---|---|
| 3,610,547 | 10/1971 | Anderson . |
| 3,659,767 | 5/1972 | Martin . |
| 3,681,176 | 8/1972 | Reifenhauser et al. . |
| 3,705,069 | 12/1972 | Elrod et al. . |
| 3,769,124 | 10/1973 | Johnson . |
| 3,956,047 | 5/1976 | Johnson . |
| 4,001,067 | 1/1977 | Johnson . |
| 4,104,108 | 8/1978 | Kishida et al. ........................ 156/510 |
| 4,246,053 | 1/1981 | Platt et al. . |
| 4,856,960 | 8/1989 | Wheeler et al. . |
| 4,915,282 | 4/1990 | Martin et al. . |
| 4,984,750 | 1/1991 | Shigeta et al. . |
| 5,064,488 | 11/1991 | Dickey . |
| 5,273,228 | 12/1993 | Yoshida et al. ........................ 156/157 |
| 5,314,568 | 5/1994 | Ryan . |
| 5,318,646 | 6/1994 | Cardini et al. . |
| 5,514,237 | 5/1996 | Emenaker et al. . |
| 5,639,338 | 6/1997 | Beckamnn .............................. 156/504 |
| 5,669,998 | 9/1997 | Ward et al. . |

Primary Examiner—Richard Crispino
Assistant Examiner—Sue A. Purvis
Attorney, Agent, or Firm—Richard M. Goldberg

[57] ABSTRACT

A heat seal splice assembly for heat splicing first and second webs together, with each web alternately constituting a running web moving in first direction and a new web to be spliced to the running web upon depletion of the running web from a roll, includes a central guide having first and second sides, with the first web being located to the first side of the central guide and the second web being located to the second side of the central guide, the central guide having a hold down assembly for holding the new web to the central guide, a rotation assembly for rotating the central guide such that the new web held to one side of the central guide can be positioned to an opposite side of the central guide at which the running web is positioned, a clamping assembly for clamping the first and second webs together, a first heat seal assembly movable toward and away from the first side of the central guide to heat seal the first and second webs together against the first side of the central guide when the first and second webs are positioned at the first side of the central guide, and a second heat seal assembly movable toward and away from the second side of the central guide to heat seal the first and second webs together against the second side of the central guide when the first and second webs are positioned at the second side of the central guide.

27 Claims, 7 Drawing Sheets

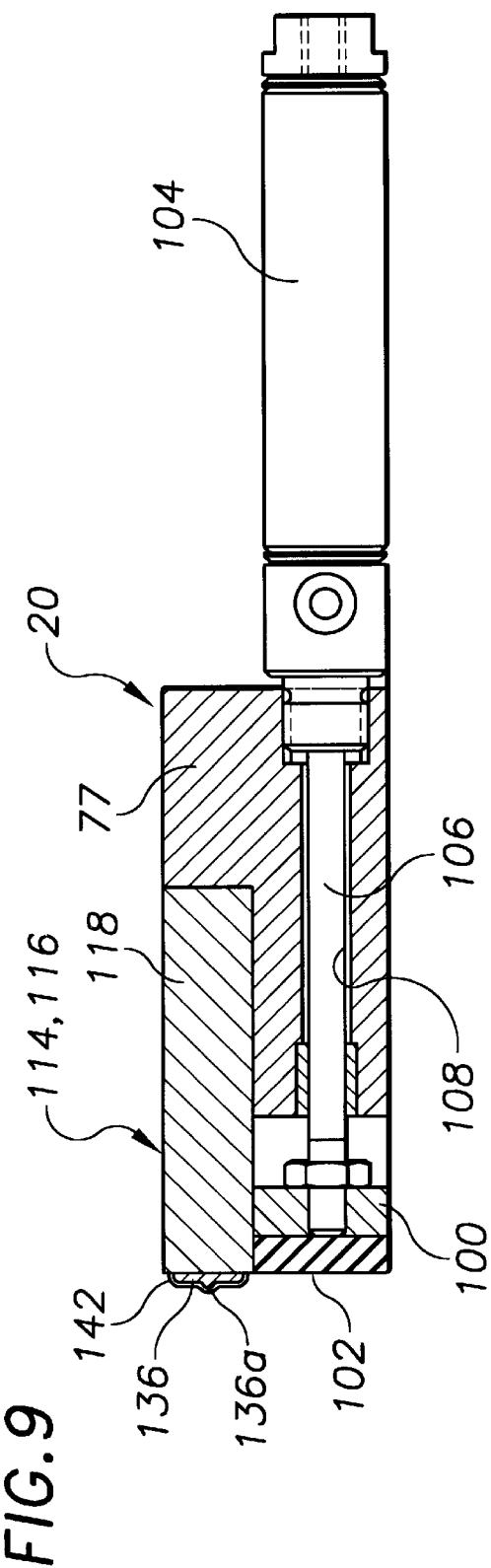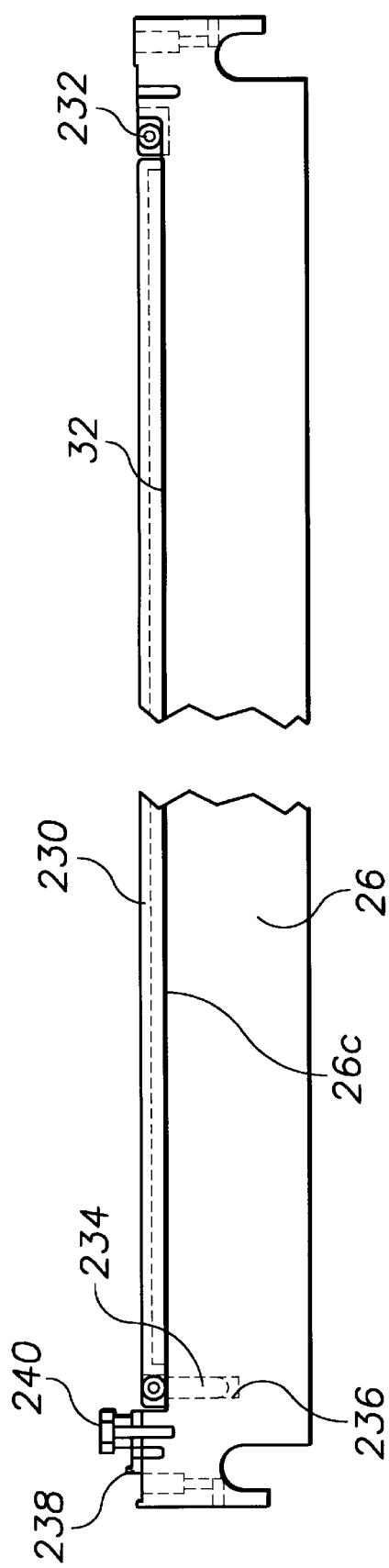

HEAT SEAL BUTT SPLICE ASSEMBLY

BACKGROUND OF THE INVENTION

The present invention relates generally to heat seal splice assemblies, and more particularly, is directed to a heat seal splice assembly for butt splicing together two webs of a thermoplastic material.

Heat seal splicing assemblies are known in the art, for example, from U.S. Pat. No. 5,669,998 to Ward et al. However, this assembly is relatively complicated, since it requires two completely separate sub-assemblies, each including its own slide bar assembly and nip bar assembly. During a splice operation, the sub-assemblies on both sides of the apparatus must be pivoted in opposite directions, since a component from each sub-assembly is used during each splice, thereby rendering the heat splicing assembly more costly and more complicated to operate.

A heat seal splicing assembly in which there is a single heat sealing element with two different back plates therefor is known from U.S. Pat. No. 3,610,547 to Anderson. However, this arrangement becomes relatively complicated since a turret assembly must be provided for the webs, requiring additional space.

U.S. Pat. No. 3,705,069 to Elrod discloses another heat seal splicing assembly. Although this assembly is simpler than the aforementioned assemblies since there is a single mandrel against which the webs are heat sealed, the mandrel is stationary. As a result, the machine must be shut down when it is necessary to provide a heat splicing operation. This, of course, is contrary to modern day splicing machines where the webs are to continue running during a splicing operation.

OBJECTS AND SUMMARY OF THE INVENTION

Accordingly, it is an object of the present invention to provide a heat seal butt splice assembly that overcomes the aforementioned disadvantages of the prior art.

It is another object of the present invention to provide a heat seal butt splice assembly that is relatively compact in size.

It is still another object of the present invention to provide a heat seal butt splice assembly that has a single central mandrel or guide against which the heat sealing takes place, while maintaining running of the running web.

It is yet another object of the present invention to provide a heat seal butt splice assembly in which the central guide is rotatable and vertically movable to permit positioning of the new web on the same side as the running web, while maintaining running of the running web.

It is a further object of the present invention to provide a heat seal butt splice assembly which provides a tensioning assembly for the heat seal band.

In accordance with an aspect of the present invention, a heat seal splice assembly is provided for heat splicing first and second webs together, with each web alternately constituting a running web moving in first direction and a new web to be spliced to the running web upon depletion of the running web from a roll. The heat seal splice assembly includes a central guide having opposite first and second sides, with the first web being located to the first side of the central guide and the second web being located to the second side of the central guide, the central guide having a hold down assembly for holding the new web to the central guide, and a rotation assembly for rotating the central guide such that the new web held to one side of the central guide is positioned to an opposite side of the central guide at which the running web is positioned. A clamping assembly is provided for clamping the first and second webs together. A first heat seal assembly is movable toward and away from the first side of the central guide to heat seal the first and second webs together against the first side of the central guide when the first and second webs are positioned at the first side of the central guide, and a second heat seal assembly is movable toward and away from the second side of the central guide to heat seal the first and second webs together against the second side of the central guide when the first and second webs are positioned at the second side of the central guide.

A moving assembly is provided for moving the central guide between a first position between the first and second heat seal assemblies and a second position away from the first and second heat seal assemblies. The moving assembly includes a cylinder/rod arrangement for moving the central guide between the first and second positions, the cylinder/rod arrangement including a rod connected with the central guide and a cylinder for extending and retracting the rod to move the central guide between the first and second positions, substantially in the direction of movement of the running web. The rotation assembly includes a rotation shaft secured to opposite ends of the central guide, bearings at opposite ends of the central guide for rotatably mounting the rotation shaft, and a rotation device secured to at least one rotation shaft for rotating the central guide. Preferably, the rotation device is a knob secured to one rotation shaft. Further, the rod is connected with the central guide through the bearings and the rotation shaft.

In addition, a rotation prevention assembly is provided for preventing rotation of the central guide when the central guide is in the first position.

The clamping assembly includes a first clamping member on the first side of the central guide, a second clamping member on the second side of the central guide, a first moving assembly connected with the first clamping member for moving the first clamping member toward and away from the second clamping member, and a second moving assembly connected with the second clamping member for moving the second clamping member toward and away from the first clamping member, such that the first and second clamping members can be brought into pressure contact with the central guide to clamp the first and second webs therebetween.

Each of the first and second clamping assemblies includes a moving block connected with a respective one of the first and second moving assemblies for movement toward and away from each other, a clamping plate assembly and a third moving assembly for moving the clamping plate assembly toward and away from the moving block. The third moving assembly includes a cylinder/rod assembly having a cylinder mounted to the moving block and a rod extendible and retractable through the moving block and connected with the clamping plate assembly.

The first heat seal assembly is fixed to the moving block of the first clamping member to be movable therewith, and the second heat seal assembly is fixed to the moving block of the second clamping member to be movable therewith.

Further, each of the first and second heat seal assemblies includes a heat seal holder and a heat seal band secured to the heat seal holder. Each heat seal assembly also includes a tensioning device for tensioning the heat seal band on the heat seal holder. The tensioning device includes a pivot assembly at one end of the heat seal holder for holding an end of the heat seal band and a biasing device for biasing the pivot assembly away from the heat seal holder to tension the heat seal band. There is also an arrangement for supplying current to the heat seal band.

In accordance with another aspect of the present invention, a heat seal splice assembly is provided for heat splicing first and second webs together, with each web alternately constituting a running web moving in first direction and a new web to be spliced to the running web upon depletion of the running web from a roll. The heat seal splice assembly includes a central guide having opposite first and second sides, with the first web being located to the first side of the central guide and the second web being located to the second side of the central guide, the central guide having a hold down assembly for holding the new web to the central guide, and a rotation assembly for rotating the central guide such that the new web held to one side of the central guide is positioned to an opposite side of the central guide at which the running web is positioned. A clamping assembly is provided for clamping the first and second webs together. The clamping assembly includes a first clamping member on the first side of the central guide, a second clamping member on the second side of the central guide, a first moving assembly connected with the first clamping member for moving the first clamping member toward and away from the second clamping member, and a second moving assembly connected with the second clamping member for moving the second clamping member toward and away from the first clamping member, such that the first and second clamping members can be brought into pressure contact with the central guide to clamp the first and second webs therebetween. A first heat seal assembly is movable toward and away from the first side of the central guide to heat seal the first and second webs together against the first side of the central guide when the first and second webs are positioned at the first side of the central guide, and a second heat seal assembly is movable toward and away from the second side of the central guide to heat seal the first and second webs together against the second side of the central guide when the first and second webs are positioned at the second side of the central guide. A third moving assembly is provided for moving the central guide between a first position between the first and second heat seal assemblies and a second position away from the first and second heat seal assemblies. A rotation prevention assembly prevents rotation of the central guide when the central guide is in the first position.

The above and other objects, features and advantages of the invention will become readily apparent from the following detailed description thereof which is to be read in connection with the accompanying drawings.

BRIEF DESCRIPTION OF THE DRAWINGS

FIG. 9 is a cross-sectional view of FIG. 5, taken along line 9—9 thereof; and

FIG. 10 is a side elevational view of a hold down assembly according to another embodiment of the present invention on a central guide.

DETAILED DESCRIPTION OF THE PREFERRED EMBODIMENT

Figure 1:
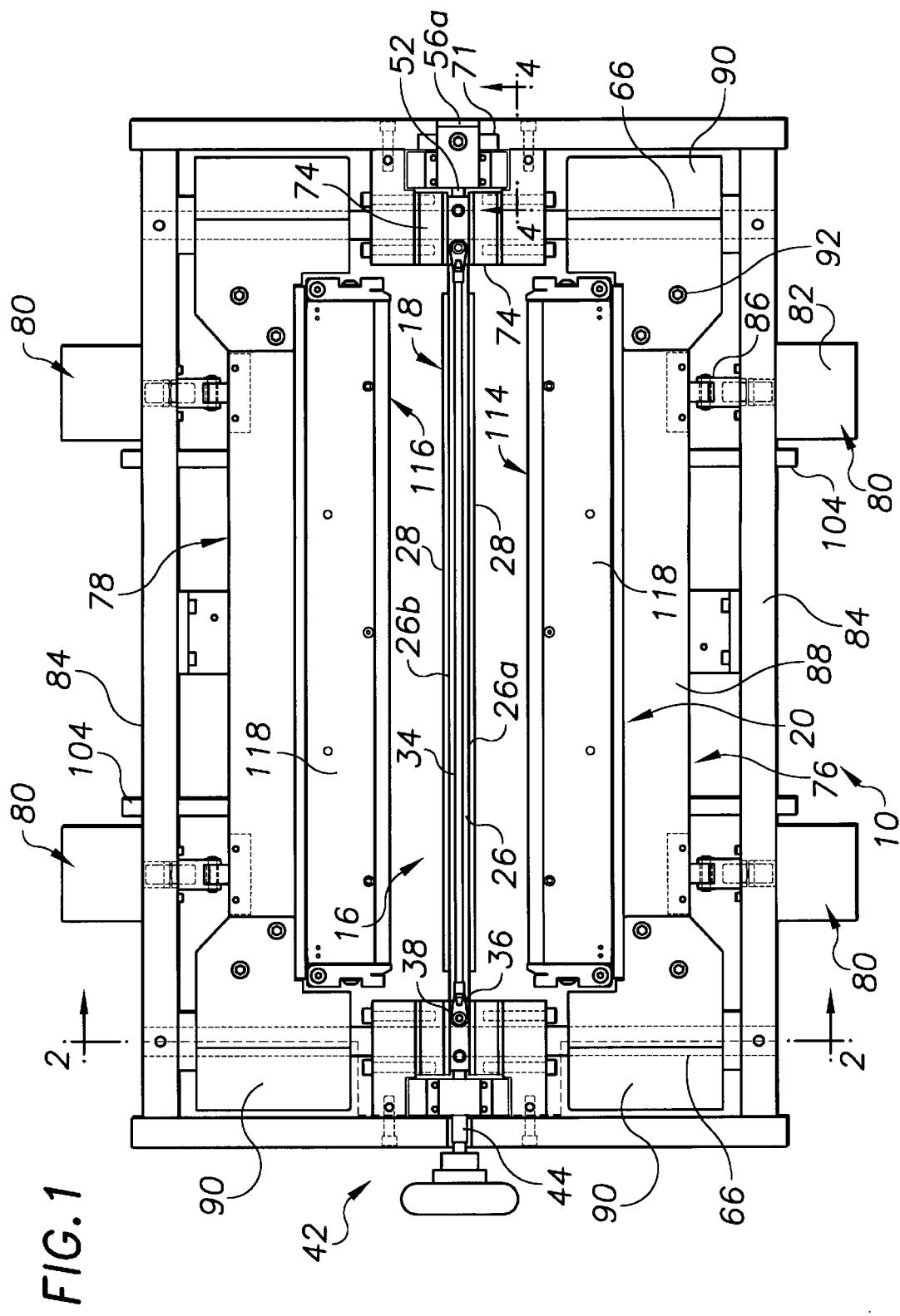
FIG. 1 is a top plan view of the apparatus according to the present invention.

Referring to the drawings in detail, a heat seal butt splice assembly 10 according to the present invention heat seal butt splices together a thermoplastic running web R moving in a first direction and a new thermoplastic web N to be spliced to running web R upon depletion of the running web R from a roll, with each web R and N alternately being positioned on different sides of assembly 10. Specifically, assume that a first web on the first side of assembly 10 is the running web R. When the first web nears depletion, it is necessary to splice the trailing end of the first running web R to the leading end of a second new web N on the opposite second side of assembly. After the butt splice has been effected, the second web becomes the running web R on the second side of assembly 10, and a new first web N is provided on the first side of assembly 10.

In general, heat seal butt splice assembly 10 includes a vertically movable and rotatable central guide 16 having a hold down assembly 18 for holding a new web N to central guide 16, a clamping assembly 20 for clamping new web N and running web R together, a first heat seal assembly 114 movable toward and away from central guide 16 to heat seal new web N and running web R together against one side of central guide 16, and a second heat seal assembly 116 movable toward and away from the opposite side of central guide 16 to heat seal new web N and running web R together against the opposite side of central guide 16.

Specifically, central guide 16 is formed from an elongated bar 26 having a generally rectangular cross-sectional configuration. Elongated bar 26 has first and second opposite sides 26a and 26b, each side having a rubber silicone layer 28 extending along most of the length thereof.

Figure 3:
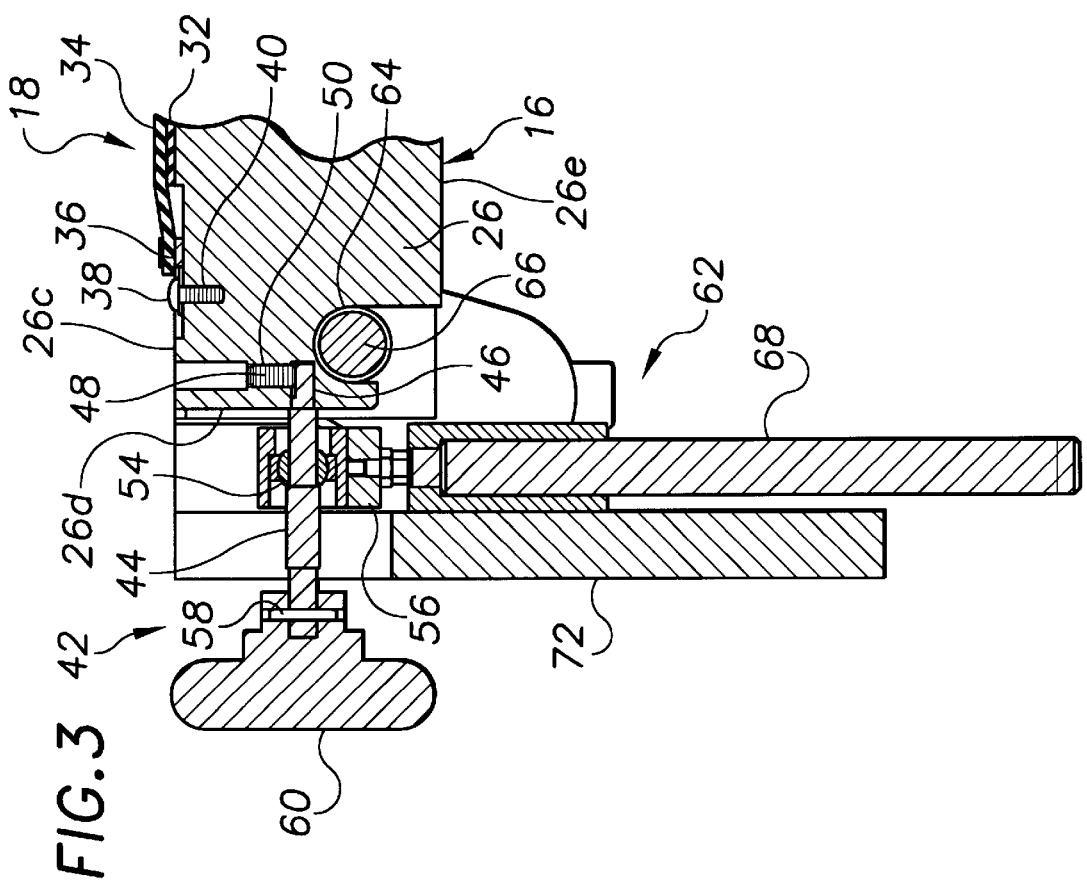
FIG. 3 is a cross-sectional view of the apparatus of FIG. 2, taken along line 3—3 thereof.

Heat seal butt splice assembly 10 also includes hold down assembly 18 for holding new web N to the upper surface 26c of elongated bar 26 of central guide 16. Specifically, a rubber silicone layer 32 is formed on upper surface 26c, and hold down assembly 18 includes a rubber band or hold down spring 34 held taut over rubber silicone layer 32 of upper surface 26c. As best shown in FIGS. 1 and 3, each end of rubber band 34 is secured to an end strip 36 which has an opening through which a bolt 38 extends, with bolt 38 threadedly received in a threaded opening 40 in upper surface 26c. Thus, as will be appreciated hereinafter, the leading end of new web N can be positioned on rubber silicone layer 32 on upper surface 26c and held down by rubber band 34.

Alternatively, as shown in FIG. 10, hold down assembly 18 includes a hold down bar 230 pivoted by a pin 232 to the upper surface 26c of elongated bar 26. The opposite end of bar 230 includes a transverse pin 234 that fits in a recess 236 at the upper surface 26c of elongated bar 26 to hold down the leading end of new web N between hold down bar 230 and rubber silicone layer 32. In order to lock bar 230 in place, a slide clamp 238 has a slot (not shown) which receives a bolt 240 for sliding movement on elongated bar 26 between the unlocking position shown in FIG. 10 and a position to the right thereof so as to overly bar 230 and prevent pivoting thereof. Then, bolt 240 can be tightened to prevent sliding movement of slide clamp 238. Of course, any other suitable hold down assembly can be used.

Heat seal butt splice assembly 10 also includes a rotation device 42 for rotating central guide 16 such that new web N held to central guide 16 by hold down assembly 18 can be rotated to an opposite side of central guide 16 and against running web R on the same side of central guide 16. As shown best in FIGS. 1 and 3, rotating device 42 includes a front rotation shaft 44 secured in a centrally located bore 46 at a front surface 26d of elongated bar 26 by a set screw 48 threadedly received in a transverse threaded bore 50, and a rear rotation shaft 52 secured centrally at a rear surface of elongated bar 26, and being in alignment with front rotation shaft 44, such that front and rear rotation shafts 44 and 52 function as axles for rotatably supporting elongated bar 26.

Each rotation shaft 44 and 52 is rotatably mounted in a spherical bearing 54 of a bearing block 56 to permit rotation thereof. The opposite end of front rotation shaft 44 is secured by a roll pin 58 to a knob 60 to permit manual rotation of central guide 16, although a motorized assembly could just as well be provided.

Further, the lower surface 26e of elongated bar 26 adjacent to each end of elongated bar 26 has arcuate recesses 64 that receive transverse slide rods 66 when elongated bar 26 is in the first lowered position of FIG. 3, without interfering with the operation of transverse slide rods 66.

Figure 2:
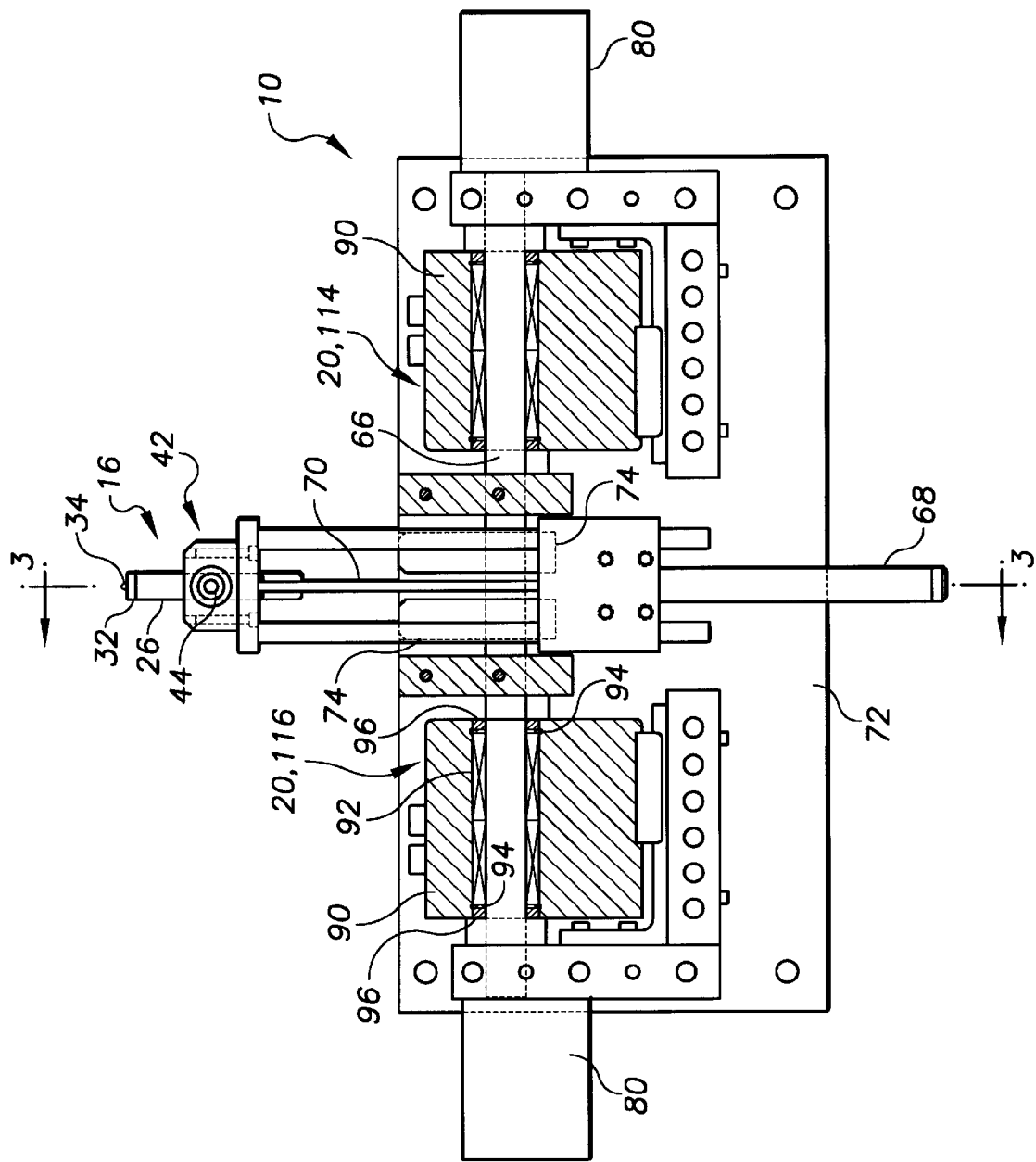
FIG. 2 is a cross-sectional view of the apparatus of FIG. 1, taken along line 2—2 thereof.

Heat seal butt splice assembly 10 further includes a moving assembly 62 for moving central guide 16 between a first lowered position shown in FIG. 3 and a second raised position shown in FIG. 2. Moving assembly 62 includes front and rear cylinders 68 secured to frame members 72 and having extendible and retractable rods 70, with free ends connected with bearing blocks 56. When rods 70 are retracted, central guide 16 is moved to the first lowered position of FIG. 3, and when extended, central guide 16 is moved to the second raised position of FIG. 2. It will be appreciated that the direction of movement of central guide 16 between the first and second positions is substantially in the direction of movement of the running web R.

Central guide 16 is preferably only rotatable in the second raised position of FIG. 2. Specifically, assembly 10 includes two guide plates 74 at each of the front and rear ends thereof, with a gap therebetween. Each guide plate 74 has a beveled upper edge. When elongated bar 26 is moved from the second raised position in FIG. 2 to the first lowered position in FIG. 3, elongated bar 26 is positioned between guide plates 74 to prevent rotation thereof. However, when central guide 16 is raised to the second position of FIG. 2, it is free of guide plates 74, and is free to rotate. As an alternative, if guide plates 74 are removed, it may be possible to rotate central guide 16 in the lowered position, in which case, cylinder 68 could be eliminated.

Figure 4:
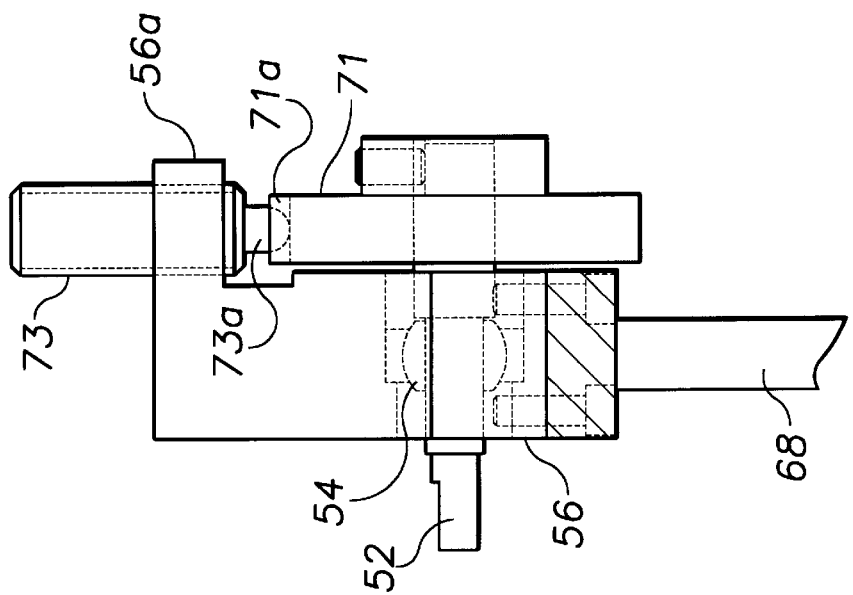
FIG. 4 is a cross-sectional view of the apparatus of FIG. 1, taken along line 4—4 thereof.

In order to maintain elongated bar 26 in the vertical position, at least during the raising and lowering operations, a positioning wheel 71 is mounted to rear rotation shaft 52, with positioning wheel 71 having a transverse V-shaped groove 71a at the upper end thereof when elongated bar 26 is oriented as shown in FIGS. 2 and 3. An extension 56a of the rear bearing block 56, as shown in FIGS. 1 and 4, holds a plunger 73 with a plunger rod 73a that is spring biased into engagement with positioning wheel 71. When elongated bar 26 is in the position shown in FIGS. 2 and 3, plunger rod 73a engages within V-shaped groove 71a to retain elongated bar 26 in this orientation. However, when knob 60 is rotated, plunger rod 73a rides out of V-shaped groove 71a.

Figure 7:
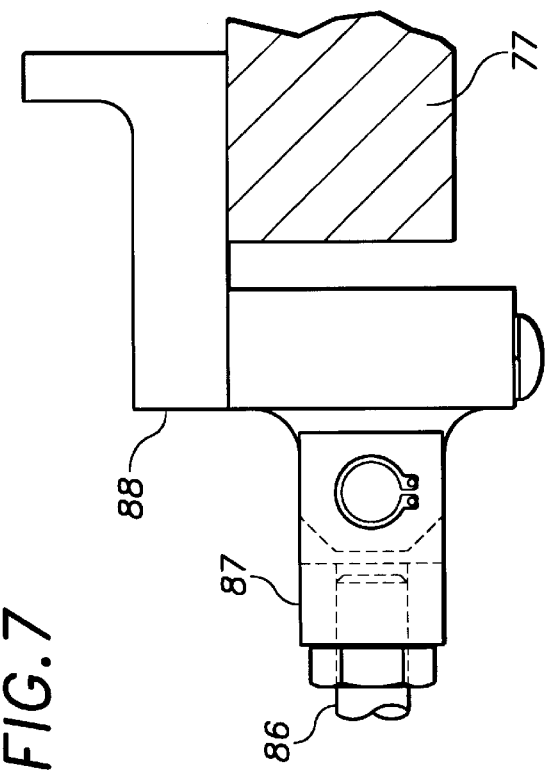
FIG. 7 is a cross-sectional view of a portion of one heat seal assembly, taken along line 7—7 of FIG. 1.

Referring now to FIGS. 1, 2, 5, 6 and 9, clamping assembly 20 includes a first clamping member 76 on the first side of central guide 16 and a second clamping member 78 on the second side of central guide 16. Each clamping member 76 and 78 includes a movable block 77. Cylinder/rod assemblies 80 are connected with movable blocks 77 of first and second clamping members 76 and 78 for moving first and second clamping members 76 and 78 toward and away from each other, such that first and second clamping members 76 and 78 can be brought into pressure contact with center guide 16 to clamp new web N and running web R therebetween. Each cylinder/rod assembly 80 includes a cylinder 82 secured to a frame member 84, and an extendible and retractable rod 86 having a free end secured to a clevis bracket 87, which in turn is connected to an L-shaped press bar 88. Press bar 88 is fixed to an outer surface of the respective movable block 77 of first and second clamping members 76 and 78 by any means such as welding or the like, as shown in FIG. 7. Preferably, there are two cylinder/rod assemblies 80 connected to each clamping member 76 and 78, although the present invention is not so limited. In this manner, clamping members 76 and 78 can be moved toward and away from each other.

Opposite ends of each press bar 88 are secured to press bar supports 90 by bolts 92. The aforementioned transverse slide shafts 66 are mounted transversely between opposite frame members 84, and press bar supports 90 are slidably mounted on respective slide shafts 66 in order to slidably support first and second clamping members 76 and 78 thereon. Specifically, as best shown in FIGS. 1 and 2, each press bar support 90 includes a ball bushing 92 held in a through bore thereof by retaining rings 94 and sealed by end seals 96.

Figure 5:
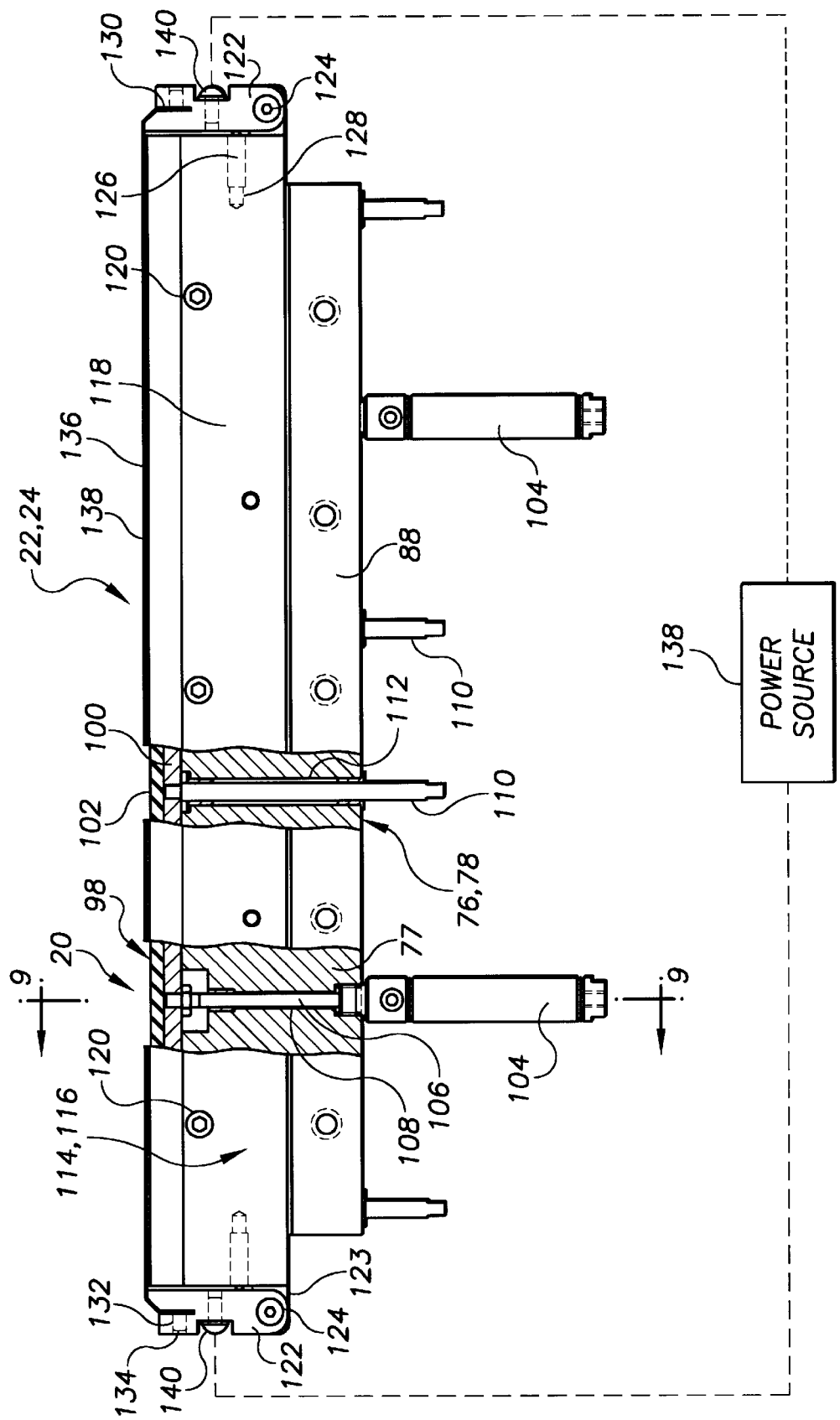
FIG. 5 is a top plan view, partly in section, of a heat seal assembly of FIG. 1.
Figure 6:
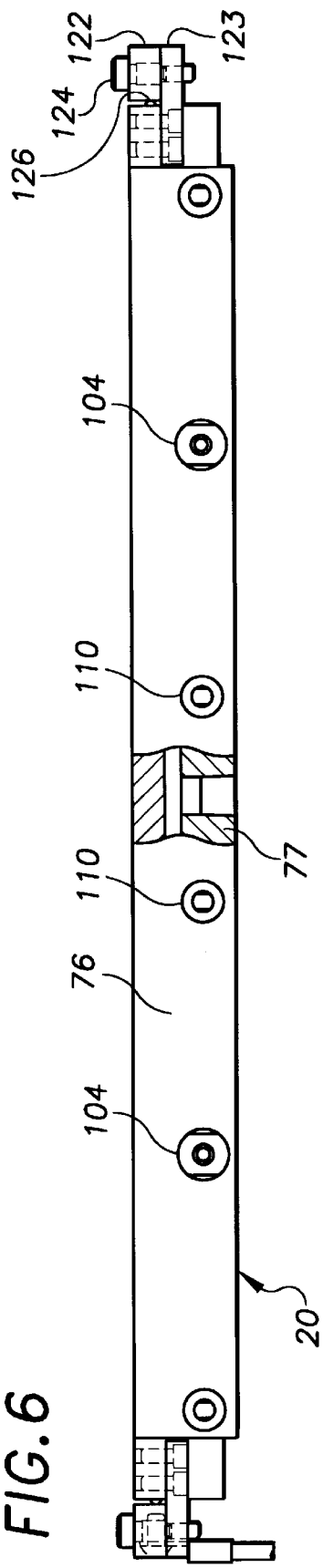
FIG. 6 is a rear elevational view, partly in section of the heat seal assembly of FIG. 5.

A clamping plate assembly 98 is positioned at the inner surface of each movable block 77 of clamping members 76 and 78, for movement toward and away from the inner surface of the respective movable block 77. Clamping plate assembly 98 includes a metal backstop plate 100 covered with a rubber clamp bar 102. Two or more cylinders 104 are secured to the outer surface of each movable block 77 and have extendible and retractable rods 106 that extend through transverse bores 108 in movable blocks 77. The free ends of rods 106 are secured to the backstop plates 100 of clamping plate assemblies 98, as best shown in FIG. 5. Thus, when rods 106 are extended, clamping plate assembly 98 moves away from the respective movable block 77, and when retracted, moves to the position shown in FIG. 5 against the inner surface of the respective movable block 77. In order to further guide and support clamping plate assembly 98, a plurality of guide pins 110 extend through additional transverse bores 112 in movable block 77, with one end of each guide pin 110 secured to backstop plate 100 and the opposite end extending out from movable block 77. Guide pins 110 are only shown in FIGS. 5 and 6, and not in FIG. 1 for the sake of simplicity of the drawing.

A first heat seal assembly 114 is mounted to movable block 77 of first clamping member 76 for movement therewith, that is, movable toward and away from first side 26a of elongated bar 26 of central guide 16 to heat seal new web N and running web R together against first side 26a, and a second heat seal assembly 116 is mounted to movable block 77 of second clamping member 78 for movement therewith, that is, movable toward and away from second side 26b of elongated bar 26 of central guide 16 to heat seal new web N and running web R together against second side 26b.

Each heat seal assembly 114 and 116 includes a heat seal holder 118 mounted on top of movable block 77 by bolts 120, for movement with movable block 77. A pivot block 122 is pivotally mounted to a lug 123 at each end of heat seal holder 118 by a shoulder screw 124 and normally biased away from heat seal holder 118 by a spring-loaded plunger 126 housed in a recess 128 in heat seal holder 118. Each pivot block 122 further includes a narrow recess 130 at the free end thereof, and a threaded bore 132 is in communication with narrow recess 130, with a set screw 134 threadedly received in threaded bore 132.

A heat seal band 136 is positioned across the inner face of heat seal holder 118 of first and second heat seal assemblies 114 and 116. In this regard, the inner face of heat seal holder 118 is covered by an insulating strip. Opposite ends of heat seal band 136 are positioned in narrow recesses 130 and held therein by set screws 134. Because of the outward biasing action of plungers 126, tension is always maintained on heat seal band 136. As shown in FIG. 9, heat seal band 136 preferably has a center protrusion 136a performs the cutting or severing of the webs after heat sealing. The heat sealing is performed by the flat sections of heat seal band 136. Heat seal band 136 is electrically connected with a power source 138 for supplying current therethrough to cause band 136 to heat up for use in a splicing operation. Specifically, bolts 140 are used for connecting power source 138 to band 136.

In order that the thermoplastic webs N and R are not damaged, that is, to ensure that the webs do not stick to heat seal band 136, heat seal band 136 is preferably covered with a "Teflon" covered strip 142.

Figures 8A, 8B, 8C:
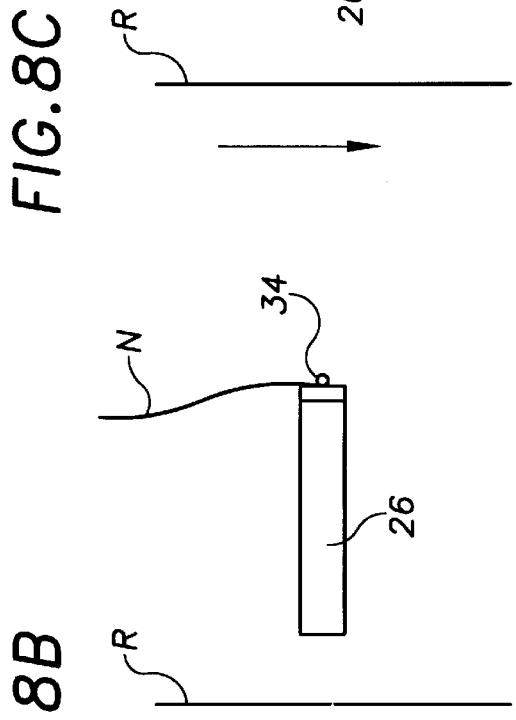
FIGS. 8A–8E are end elevational views of the central guide, shown in different rotational positions.
Figures 8D, 8E:
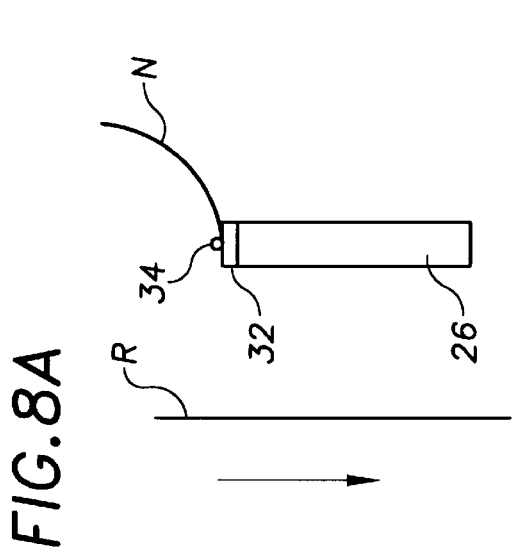

With the arrangement described above, and while running web R is running, elongated bar 26 is raised to the second raised position in FIG. 2. Then, the leading edge of a new web N is inserted under and held by rubber band 34 of hold down assembly 18 on the opposite side of elongated bar 26 from running web R. Elongated bar 26 is then rotated 360 degrees by knob 60, in the order of FIGS. 8A–8E. At this time, plunger rod 73a moves out of V-shaped groove 71a. It will be appreciated that new web N is originally on the opposite side as running web R, as shown in FIG. 8A. However, after rotation to the position shown in FIG. 8E, a portion of new web N is on the same side as running web R, but spaced therefrom, so as not to interfere with the running of running web R. Then, central guide 16 is lowered to the first position shown in FIG. 3, where rotation thereof is prevented by guide plates 74. In this position, new web N and running web R are on the same side of central guide 16 and can be heat sealed together.

When running web R has neared depletion, cylinder/rod assemblies 80 are actuated to extend rods 86. This results in first and second clamping members 76 and 78, and first and second heat seal assemblies 114 and 116, moving toward each other. Accordingly, new web N and running web R are clamped together between rubber clamp bar 102 and central guide 16. Running web R will continue to run downstream thereof due to a festoon or accumulator, as is well known in the art. In addition, new web N and running web R are held tightly against one another by heat seal bands 136. Thereafter, current is supplied to heat seal bands 136 from power source 138. Alternatively, power is supplied prior to clamping. This results in heating of the thermoplastic material of webs N and R at a surface contact to seal webs N and R together, and at a line contact between protrusion 136a of heat seal band 136 and central guide 16 for the severing of webs N and R thereat, so as to provide a butt splice. In such case, protrusion 136a deforms rubber silicone layer 28. This means that the trailing end of running web R is now butt spliced to the leading end of new web N.

Then, rods 86 of cylinder/rod assemblies 80 are retracted, thereby retracting movable block 77 and heat seal holder 118. As a result, heat seal band 136 is moved away from webs N and R. However, at the same time, cylinders 104 are activated to extend rods 106. Therefore, webs N and R remain clamped between clamping plate assembly 98 and central guide 16. After a short time, for example, approximately one second depending on the type and thickness of the material, when the thermoplastic material of webs N and R has cooled, rods 106 are retracted to release webs N and R. Thereafter, the new web N becomes the running web R, and another web replaces the previous running web R and becomes the new web N.

This operation is repeated on opposite sides of central guide 16 for each heat seal butt splice.

Having described a specific preferred embodiment of the invention with reference to the accompanying drawings, it will be appreciated that the present invention is not limited to that precise embodiment and that various changes and modifications can be effected therein by one of ordinary skill in the art without departing from the scope or spirit of the invention as defined by the appended claims.

What is claimed is:

1. A heat seal splice assembly for heat splicing first and second webs together, with each web alternately constituting a running web moving in a first direction and a new web to be spliced to the running web upon depletion of the running web from a roll, the heat seal splice assembly comprising:

a central guide having opposite first and second sides, with the first web being located to said first side of said central guide and the second web being located to said second side of said central guide, said central guide having a hold down assembly for holding the new web to said central guide;

a rotation assembly for rotating said central guide such that said new web held to one side of said central guide is positioned to an opposite side of said central guide at which said running web is positioned;

a clamping assembly for clamping said first and second webs together;

a first heat seal assembly movable toward and away from said first side of said central guide to heat seal said first and second webs together against the first side of said central guide when said first and second webs are positioned at the first side of the central guide;

a second heat seal assembly movable toward and away from said second side of said central guide to heat seal said first and second webs together against the second side of said central guide when said first and second webs are positioned at the second side of the central guide; and a moving assembly for moving said central guide between a first position between said first and second heat seal assemblies and a second position away from said first and second heat seal assemblies.

2. A heat seal splice assembly according to claim 1, wherein said moving assembly includes a cylinder/rod arrangement for moving said central guide between said first and second positions, said cylinder/rod arrangement including a rod connected with said central guide and a cylinder for extending and retracting said rod to move said central guide between said first and second positions, substantially in the direction of movement of said running web.

3. A heat seal splice assembly according to claim 2, wherein said rotation assembly includes:

a rotation shaft secured to opposite ends of said central guide; and bearings at opposite ends of said central guide for rotatably mounting said rotation shaft; and wherein said rod is connected with said central guide through said bearings and said rotation shaft.

4. A heat seal splice assembly according to claim 1, further comprising a rotation prevention assembly for preventing rotation of said central guide when said central guide is in said first position.

5. A heat seal splice assembly according to claim 1, wherein said rotation assembly includes:
   a rotation shaft secured to opposite ends of said central guide;
   bearings at opposite ends of said central guide for rotatably mounting said rotation shaft; and
   a rotation device secured to at least one rotation shaft for rotating said central guide.

6. A heat seal splice assembly according to claim 1, wherein said clamping assembly includes:
   a first clamping member on said first side of said central guide;
   a second clamping member on said second side of said central guide;
   a first moving assembly connected with said first clamping member for moving said first clamping member toward and away from said second clamping member; and
   a second moving assembly connected with said second clamping member for moving said second clamping member toward and away from said first clamping member, such that said first and second clamping members can be brought into pressure contact with the central guide to clamp said first and second webs therebetween.

7. A heat seal splice assembly according to claim 6, wherein each of said first and second clamping assemblies includes:
   a moving block connected with a respective one of said first and second moving assemblies for movement toward and away from each other;
   a clamping plate assembly; and
   a third moving assembly for moving said clamping plate assembly toward and away from the moving block.

8. A heat seal splice assembly according to claim 7, wherein said third moving assembly includes a cylinder/rod assembly having a cylinder mounted to said moving block and a rod extendible and retractable through said moving block and connected with said clamping plate assembly.

9. A heat seal splice assembly according to claim 7, wherein said first heat seal assembly is fixed to said moving block of said first clamping member to be movable therewith, and said second heat seal assembly is fixed to said moving block of said second clamping member to be movable therewith.

10. A heat seal splice assembly according to claim 1, wherein each of said first and second heat seal assemblies includes:
    a heat seal holder; and
    a heat seal band secured to said heat seal holder.

11. A heat seal splice assembly according to claim 10, wherein each said heat seal assembly includes a tensioning device for tensioning said heat seal band on said heat seal holder.

12. A heat seal splice assembly according to claim 11, wherein said tensioning device includes:
    a pivot assembly at one end of said heat seal holder for holding an end of said heat seal band; and
    a biasing device for biasing said pivot assembly away from said heat seal holder to tension said heat seal band.

13. A heat seal splice assembly according to claim 10, wherein each of said first and second heat seal assemblies includes an arrangement for supplying current to said heat seal band.

14. A heat seal splice assembly for heat splicing first and second webs together, with each web alternately constituting a running web moving in a first direction and a new web to be spliced to the running web upon depletion of the running web from a roll, the heat seal splice assembly comprising:
    a central guide having opposite first and second sides, with the first web being located to said first side of said central guide and the second web being located to said second side of said central guide, said central guide having a hold down assembly for holding the new web to said central guide;
    a rotation assembly for rotating said central guide such that said new web held to one side of said central guide is positioned to an opposite side of said central guide at which said running web is positioned, said rotation assembly including:
        a rotation shaft secured to opposite ends of said central guide;
        bearings at opposite ends of said central guide for rotatable mounting said rotation shaft; and
        a rotation device secured to at least one rotation shaft for rotating said central guide, said rotation device including a knob secured to said one rotation shafts;
    a clamping assembly for clamping said first and second webs together;
    a first heat seal assembly movable toward and away from said first side of said central guide to heat seal said first and second webs together against the first side of said central guide when said first and second webs are positioned at the first side of the central guide; and
    a second heat seal assembly movable toward and away from said second side of said central guide to heat seal said first and second webs together against the second side of said central guide when said first and second webs are positioned at the second side of the central guide.

15. A heat seal splice assembly for heat splicing first and second webs together, with each web alternately constituting a running web moving in first direction and a new web to be spliced to the running web upon depletion of the running web from a roll, the heat seal splice assembly comprising:
    a central guide having opposite first and second sides, with the first web being located to said first side of said central guide and the second web being located to said second side of said central guide, said central guide having a hold down assembly for holding the new web to said central guide;
    a rotation assembly for rotating said central guide such that said new web held to one side of said central guide is positioned to an opposite side of said central guide at which said running web is positioned;
    a clamping assembly for clamping said first and second webs together, said clamping assembly including:
        a first clamping member on said first side of said central guide;
        a second clamping member on said second side of said central guide;
        a first moving assembly connected with said first clamping member for moving said first clamping member toward and away from said second clamping member; and a second moving assembly connected with said second clamping member for moving said second clamping member toward and away from said first clamping member, such that said first and second clamping members can be brought into pressure contact with the central guide to clamp said first and second webs therebetween;

a first heat seal assembly movable toward and away from said first side of said central guide to heat seal said first and second webs together against the first side of said central guide when said first and second webs are positioned at the first side of the central guide;

a second heat seal assembly movable toward and away from said second side of said central guide to heat seal said first and second webs together against the second side of said central guide when said first and second webs are positioned at the second side of the central guide;

a third moving assembly for moving said central guide between a first position between said first and second heat seal assemblies and a second position away from said first and second heat seal assemblies; and a rotation prevention assembly for preventing rotation of said central guide when said central guide is in said first position.

16. A heat seal splice assembly according to claim 15, wherein said third moving assembly includes a cylinder/rod arrangement for moving said central guide between said first and second positions, said cylinder/rod arrangement including a rod connected with said central guide and a cylinder for extending and retracting said rod to move said central guide between said first and second positions, substantially in the direction of movement of said running web.

17. A heat seal splice assembly according to claim 16, wherein said rotation assembly includes:
a rotation shaft secured to opposite ends of said central guide; and
bearings at opposite ends of said central guide for rotatably mounting said rotation shaft; and
wherein said rod is connected with said central guide through said bearings and said rotation shaft.

18. A heat seal splice assembly according to claim 15, wherein said rotation assembly includes:
a rotation shaft secured to opposite ends of said central guide;
bearings at opposite ends of said central guide for rotatably mounting said rotation shaft; and
a rotation device secured to at least one rotation shaft for rotating said central guide.

19. A heat seal splice assembly according to claim 18, wherein said rotation device includes a knob secured to said one rotation shaft.

20. A heat seal splice assembly according to claim 15, wherein each of said first and second clamping assemblies includes:
a moving block connected with a respective one of said first and second moving assemblies for movement toward and away from each other;
a clamping plate assembly; and
a fourth moving assembly for moving said clamping plate assembly toward and away from the moving block.

21. A heat seal splice assembly according to claim 20, wherein said fourth moving assembly includes a cylinder/rod assembly having a cylinder mounted to said moving block and a rod extendible and retractable through said moving block and connected with said clamping plate assembly.

22. A heat seal splice assembly according to claim 20, wherein said first heat seal assembly is fixed to said moving block of said first clamping member to be movable therewith, and said second heat seal assembly is fixed to said moving block of said second clamping member to be movable therewith.

23. A heat seal splice assembly according to claim 15, wherein each of said first and second heat seal assemblies includes a heat seal holder, with said heat seal band secured to said heat seal holder.

24. A heat seal splice assembly according to claim 23, wherein each said heat seal assembly includes a tensioning device for tensioning said heat seal band on said heat seal holder.

25. A heat seal splice assembly according to claim 24, wherein said tensioning device includes:
a pivot assembly at one end of said heat seal holder for holding an end of said heat seal band; and
a biasing device for biasing said pivot assembly away from said heat seal holder to tension said heat seal band.

26. A heat seal splice assembly according to claim 15, wherein each of said first and second heat seal assemblies includes an arrangement for supplying current to said heat seal band.

27. A heat seal splice assembly for heat splicing first and second webs together, with each web alternately constituting a running web moving in a first direction and a new web to be spliced to the running web upon depletion of the running web from a roll, the heat seal splice assembly comprising:
a central guide having opposite first and second sides, with the first web being located to said first side of said central guide and the second web being located to said second side of said central guide, said central guide having a hold down assembly for holding the new web to said central guide;
a rotation assembly for rotating said central guide such that said new web held to one side of said central guide is positioned to an opposite side of said central guide at which said running web is positioned;
a clamping assembly for clamping said first and second webs together;
a first heat seal assembly movable in a first direction toward and away from said first side of said central guide to heat seal said first and second webs together against the first side of said central guide when said first and second webs are positioned at the first side of the central guide;
a second heat seal assembly movable in said first direction toward and away from said second side of said central guide to heat seal said first and second webs together against the second side of said central guide when said first and second webs are positioned at the second side of the central guide; and
a moving assembly for providing relative movement between said central guide and said first and second heat seal assemblies in a second direction substantially transverse to said first direction, such that said central guide can be arranged in a first position between said first and second heat seal assemblies and a second position away from said first and second heat seal assemblies.

* * * * *